(Model.)
D. A. RAGAN.
SEAL TRAP.
No. 245,213. Patented Aug. 2, 1881.
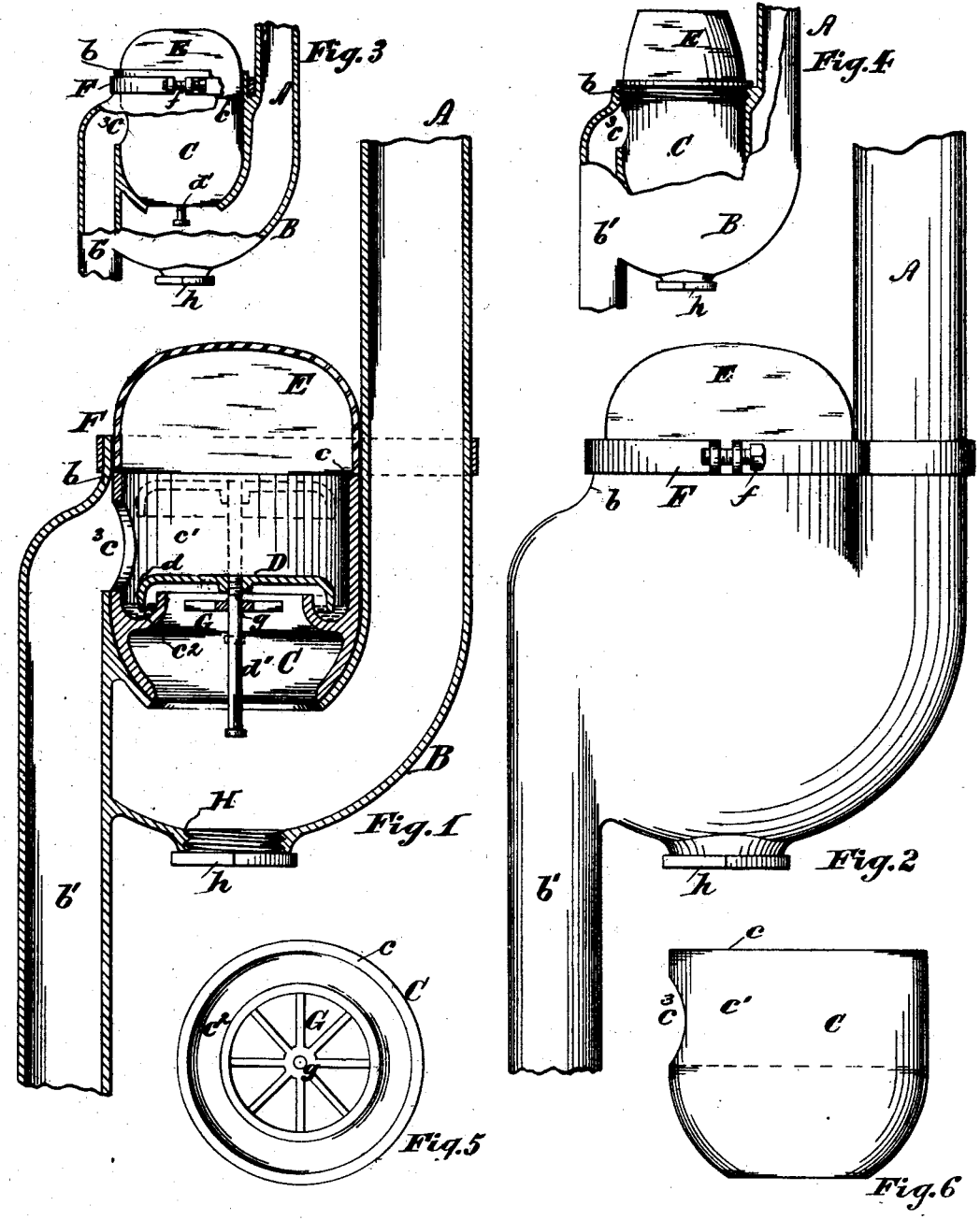
WITNESSES:
INVENTOR,
Dennis A. Ragan,
By Connolly Bros
ATTORNEYS

UNITED STATES PATENT OFFICE.

DENNIS A. RAGAN, OF PHILADELPHIA, PENNSYLVANIA, ASSIGNOR OF ONE-THIRD TO CHARLES H. GRAHAM, OF SAME PLACE.

SEAL-TRAP.

SPECIFICATION forming part of Letters Patent No. 245,213, dated August 2, 1881.

Application filed February 3, 1881. (Model.)

*To all whom it may concern:*

Be it known that I, DENNIS A. RAGAN, a citizen of the United States, resident of the city of Philadelphia, in the county of Philadelphia and State of Pennsylvania, have invented certain new and useful Improvements in Seal-Trap Joints for Wash-Basins, &c., of which the following is a specification, reference being had to the accompanying drawings, wherein—

Figure 1 is a vertical section of a seal-joint trap embodying my improvements. Fig. 2 is an elevation of the same. Figs. 3 and 4 are elevations, partly in section, showing slight modifications in the construction of the cover or cap fastening of the seal-joint trap; and Figs. 5 and 6 are, respectively, a plan and an elevation of the mercury trough or bowl and strainer.

My invention has for its object to provide a device for preventing the passage of sewer-gas through the waste-pipes of wash-stands, &c., in which the seal shall be composed of mercury and water.

My invention has for its further object to provide means for preventing the mercury-seal from becoming fouled or rendered ineffective by the admission to or lodgment in it of hair, pieces of paper, seeds, or other solid objects passing through the pipe.

A still further object of my invention is to provide means whereby access may be had to the trap with which the seal connects or of which it forms a part, for the purpose of cleaning the same.

Referring to the accompanying drawings, A indicates the waste-pipe of a wash-stand or other like fixture.

B represents a trap (which may be an S or a P or other form of trap) located therein.

C represents a bowl fitted in one of the branches of said trap and provided with a cap, E, said cap being designed to be made of glass, so as to permit inspection of the interior of the trap without removing the cap. Said cap rests on the upper edge of the bowl and fits inside of the outer wall, $b$, of the trap, thus forming a top for the latter. It is secured in position by a composition joint, or by a screw, or preferably by a clamping-band, F, having a tightening-screw, $f$, which permits its removal when required. Said band may encircle the pipe A, as shown in Figs. 1 and 2, or only the branch $b$ of the trap B, as shown in Fig. 3.

The bowl is of the peculiar shape shown, its upper edge, $c$, affording a seat for the cap E, while the wall $c'$ is formed with an opening, $c^3$, or passage-way to branch $b'$ of the trap B. Said bowl is formed with an internal annular groove or channel, $c^2$, which forms a receptacle for mercury.

D is a disk or valve having a depending annular flange, $d$, which is designed to dip in the groove $c^2$ and form a seal-joint with the mercury contained in said groove. Said disk D has a stem, $d'$, which slides in a central opening, $g$, in a fixed strainer, G, fitted inside the inner wall of the groove $c^2$. Said strainer is designed to be made of brass or to have a brass bushing, so as to prevent corrosion between it and the valve-stem $d'$.

H is a clear-out opening in the bottom of the trap B, provided with a screw, $h$.

The operation is as follows: The parts being arranged as shown, the flange $d$ dips into the mercury in the groove $c^2$ and forms a mercury seal which will effectually prevent the passage of sewer-gas through the trap. The water in the latter below the mercury also forms a seal, re-enforcing the action of the mercury or forming a double seal. When the water in the pipe A rises sufficiently it will lift the valve D and escape through the branch $b'$ of the trap, said valve sealing again in the mercury when the water in the pipe A has lowered sufficiently to permit it. The strainer G prevents any solid matter of sufficient size to foul the mercury to pass into the groove $c^2$. When desired, the strainer and trap may be cleaned by removing the cap E or the screw $h$ in the clean-out opening H.

The trap B is designed to be in one piece with the pipe A and formed of lead, thus permitting the formation of a wipe-joint where a connection is required and dispensing with screw-couplings. The bowl C is designed to be an iron casting, which will avoid the amalgamation of the mercury therewith.

What I claim as my invention is as follows:

1. In combination with the bowl C, having mercury-groove $c^2$, the disk or valve D, having depending flange $d$ and stem $d'$, substantially as shown and described.

2. In combination with bowl C, having mercury-groove $c^2$, and valve D, having stem $d'$, the strainer G, affording a bearing for said stem and protecting said groove from fouling, substantially as shown and described.

3. The combination, with lead pipe A, of trap B, iron bowl C, having mercury-groove $c^2$, cap E, valve D, having flange $d$ and stem $d'$, and strainer G, substantially as shown and described.

In testimony that I claim the foregoing I have hereunto set my hand this 2d day of February, 1881.

DENNIS A. RAGAN.

Witnesses:
JOHN RODGERS,
S. J. VAN STAVOREN.